United States Patent
Taylor

(12) 
(10) Patent No.: US 6,425,410 B1
(45) Date of Patent: Jul. 30, 2002

(54) HIGH IMPACT TYPE GATE PRESSURE RELEASE VALVE

(76) Inventor: Julian S. Taylor, 8300 SW. 8th St., Oklahoma City, OK (US) 73128

( * ) Notice: Subject to any disclaimer, the term of this patent is extended or adjusted under 35 U.S.C. 154(b) by 0 days.

(21) Appl. No.: 09/656,244

(22) Filed: Sep. 6, 2000

(51) Int. Cl.[7] .............................................. F16K 17/14
(52) U.S. Cl. ......................... 137/70; 137/71; 137/467; 137/494; 251/282
(58) Field of Search .......................... 137/70, 71, 467, 137/494; 251/282

(56) References Cited

U.S. PATENT DOCUMENTS

| | | | | |
|---|---|---|---|---|
| 3,476,133 A | * | 11/1969 | Stedfeld | ................. 137/467 X |
| 3,726,306 A | * | 4/1973 | Purvis | .................... 137/494 X |
| 3,871,616 A | | 3/1975 | Taylor | ......................... 251/175 |
| 4,651,772 A | * | 3/1987 | Carlin | .................... 137/467 X |
| 4,787,409 A | * | 11/1988 | Taylor | ....................... 137/70 X |
| 5,297,575 A | | 3/1994 | Taylor | ......................... 137/70 |
| 6,155,284 A | * | 12/2000 | Scantlin | ........................ 137/70 |

* cited by examiner

Primary Examiner—John Rivell
(74) Attorney, Agent, or Firm—Robert K. Rhea

(57) ABSTRACT

An inline high pressure fluid release valve is formed by a valve body having a transverse opening forming a fluid passageway interposed in a fluid conductor. A vertically moveable plunger in the valve body includes a disc normally closing the fluid passageway. A pin cage assembly includes a collapsible pin axially connected with a vertically movable valve stem on the plunger is responsive to excess fluid pressure unbalancing a valve stem and collapsing the pin and impact moving the plunger to a fluid passageway open position.

6 Claims, 2 Drawing Sheets

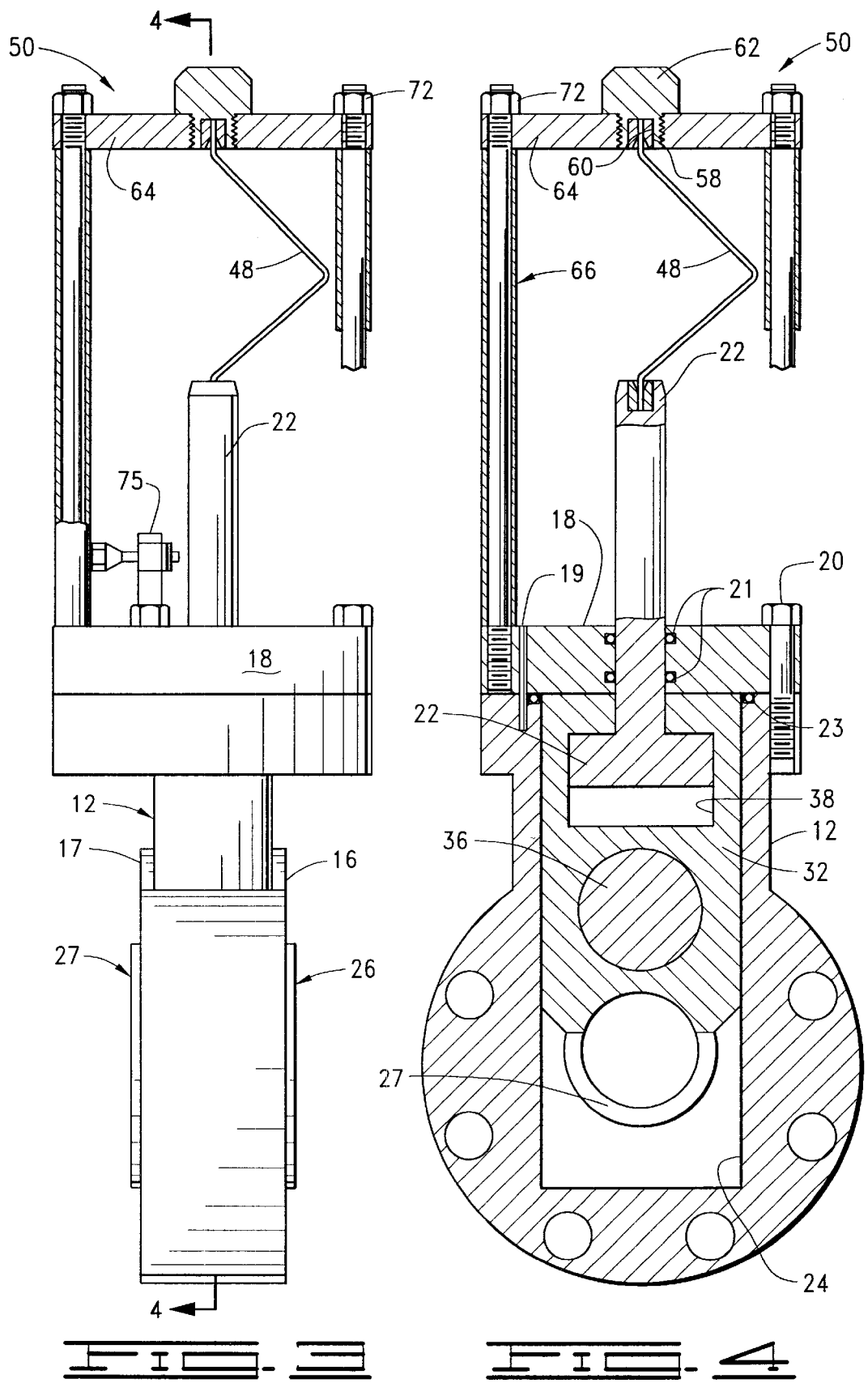

HIGH IMPACT TYPE GATE PRESSURE RELEASE VALVE

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This present invention relates to relatively high fluid pressure relief valves and more particularly to a disc type inline relief valve.

1. Field of the Invention

In high pressure fluid systems it is desirable to monitor the fluid pressure and release it downstream when it reaches a predetermined value. This invention provides a high pressure release valve which may be interposed in a high pressure fluid conductor and features a plunger, vertically moveable in a valve body, normally balanced by fluid pressure until an excess fluid pressure value biases the plunger toward the valve head and lifts the valve stem collapsing the pin of a pin cage means and opens the valve to release fluid downstream.

2. Description of the Prior Art

U.S. Pat. No. 3,871,116, issued Mar. 18, 1975 to Taylor for Gate Valve Disc, discloses a gate valve having a flow passage provided with a valve stem removable disc having an opening permitting fluid flow through the passageway when in open position and interrupting fluid flow when the disc is in a valve closed position. The disc is further provided with a removable cylindrical plug mating with ring-like seats on opposite sides of the disc, surround a coaxial with the fluid passageway.

U.S. Pat. No. 5,297,575, issued Mar. 29, 1994 for Inline High Pressure Fluid Release Valve discloses an inline high pressure fluid release valve formed by a valve body having a cylinder and a transverse opening forming a fluid passageway interposed in a fluid conductor. A piston normally closes the fluid passageway and includes a fluid passageway sized transverse opening is guided to prevent angular rotation during longitudinal sliding movement of the cylinder by a piston rod and a cylinder wall supported guide rod projecting into a piston wall slot for mating and mismating the piston opening with the flow passageway. A pin cage connected with the piston rod end of the cylinder axially supports a collapsible pin normally biasing the piston to a fluid passageway closed position until upstream fluid pressure of predetermined value channeled through a cylinder wall fluid bypass at the piston end opposite the piston rod to bias the piston toward a passageway open position for releasing fluid pressure downstream. A fluid bypass check valve holds fluid under pressure in the piston cavity and against the piston end opposite its rod to insure full travel of the piston for axially aligning its opening with the fluid passageway.

BRIEF SUMMARY OF THE INVENTION

A gate valve having a body with a flow passageway therethrough is provided with a guide slot transversely intersecting the flow passageway for slideably receiving a passageway closing disc. The body supports a seating ring coaxial with the flow passageway at the upstream and downstream sides of the disc receiving slot. A plunger is slidably positioned within the body slot. The plunger is transversely apertured providing an opening movable into and out of axial registration with the flow passageway by vertical movement of the plunger and a cylindrical disc is removably supported by the plunger aperture for sealingly mating with the adjacent surface of one of the seating rings when the disc is in flow passageway closed position.

The principal object of this invention is to provide a disc for a gate valve for controlling the flow of fluid under high pressure by providing a plunger having a disc which is not easily damaged by rough treatment for sealing with a gate valve ring surrounding the flow passageway on opposite sides of the disc when the latter is in flow passageway closed position and that will allow for a disc closure with a seat whose axis is not in exact coaxial alignment with the flow passageway.

BRIEF DESCRIPTION OF THE SEVERAL VIEWS OF THE DRAWINGS

FIG. 3 is a view similar to FIG. 2 illustrating the valve in opened position; and, FIG. 4 is a vertical cross sectional view taken substantially along the line 4—4 of FIG. 3.

DETAILED DESCRIPTION OF THE INVENTION

Figures 1, 2:
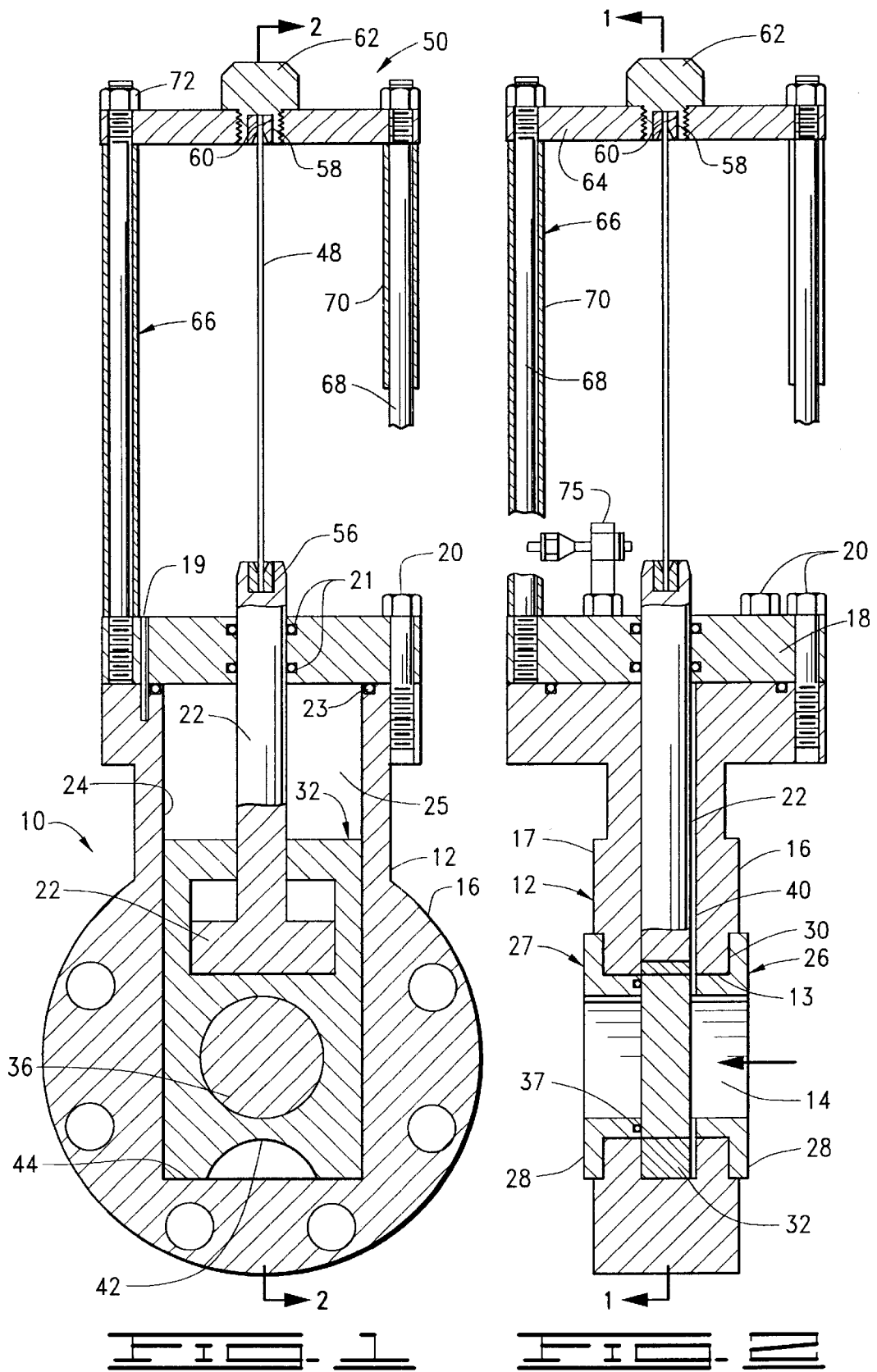
FIG. 1 is an elevational view, partly in section, of the upstream side of the gate valve looking in the direction of the arrows 1—1 of FIG. 2.
FIG. 2 is a vertical cross sectional view taken substantially along the line 2—2 of FIG. 1.

Like characters of reference designate like part in those figures of the drawings in which they occur.

In the drawings:

The reference numeral 10 indicates the gate valve as a whole comprising a body 12 having a transverse bore 13 forming a flow passageway 14 therethrough. The upstream and downstream sides of the body 12 are provided with bolt flanges 16 and 17, respectively, for connecting the gate valve to adjacent ends of a conductor such as a pipe, not shown. The gate valve body is provided with a head end or cap 18 indexed by a pin 19 and connected by bolts 20. The head is centrally bored and provided with O-ring seals 21 for slidably receiving a valve stem 22 having a rectangular depending end portion 22', T-shaped in general configuration, for the reason presently explained. The valve body 12 is provided with a rectangular in cross section upwardly open slot 24 forming a chamber 25 closed by the valve head 18 and a seal ring 23 which slideably receives a fluid passageway closing disc 36, as presently explained.

A pair of flanged end seal rings 26 and 27 are coaxially received by the body bore 13 with the flanges 28 of the seal rings partially nested by annular recesses 30 formed in the upstream and downstream ends of the body flanges 16 and 17.

A plunger 32, rectangular in cross section is vertically slidable in the slot 24 forming an upper chamber 25. The plunger is provided, in its depending end portion, with an aperture 34, which receives a disc 36 diametrically greater than the diameter of the flow passageway 14 as defined by the inner periphery of the sealing rings 26 and 27 so that the disc 36, when axially disposed in the valve body, passageway 14 seals with an O-ring 37 in the upstream end of the downstream seal ring 27 to interrupt fluid flow through the passageway 14. The upper end portion of the plunger 32 is provided with a transverse inverted T-shaped opening 38 cooperatively loosely nesting the T-shaped end of the valve stem 22, (FIG. 1). A small passageway, indicated by the closely spaced lines 40 (FIG. 2), is formed by the loose fit of the valve stem 22 and the plunger 32, with respect to the upstream side of the valve body 12, which permits upstream fluid under pressure to enter chambers above and below the plunger. The depending end surface of the plunger having an arcuate recess 42 and beveled depending end edges 44 permitting fluid pressure to normally balance the plunger and disc when in valve closed position and is maintained in this position by a fluid pressure responsive collapsible pin 48 forming a part of a cage means 50 secured to the valve head 18.

The pin cage means 50 comprises the collapsible pin 48 inserted at its depending end portion in a bushing 54 nested by a socket 56 formed in the uppermost end portion of the stem 22. The other end portion of the collapsible pin is similarly inserted in a bushing 58 nested by a socket 60 formed in a pin nut 62 threadedly received by a centrally bored and threaded cage end plate 64 maintained in parallel spaced relation with respect to the valve head 18 by a plurality (3) of post means 66. The post means 66 are equally spaced radially about the axis of the collapsible pin, and in the interest of brevity only one the post means is described in detail.

The post means comprises a bolt 68 threadedly connected at its depending end with the valve head 18 and slidably received at its other threaded end portion by a bore in the cage plate 64 with a tubular sleeve spacer 70 surrounding the post and interposed between the valve head 18 and the cage plate 64. A nut 72 connected with the upper end of the respective post impinges the spacers between the head 18 and cage plate 64.

OPERATION

The valve 10 is assumed installed in a fluid conductor and the plunger 32 is normally in the solid line position of FIG. 1, closing the fluid passageway 14. In the event fluid pressure at the upstream side of the disc 36 acting on the cross-sectional area of the stem 22 exceeds a predetermined value the excess pressure against the depending end of the valve stem 22 independently forces the valve stem 22 upwardly collapsing the pin 48. Simultaneously, the bar of the valve stem T-shaped opening, assisted by the excess fluid pressure and valve opening friction reduction, impacts on the plunger 32 forcing it upwardly and opens the valve passageway 14 by movement of the disc 36 out of alignment with the fluid passageway. After the problems, if any, have been corrected the valve 10 may be replaced in operation by simply removing the collapsed pin 48 and manually forcing the plunger 32 to a solid line position (FIG. 1) and, after removing the pin nut 62, installing a replaceable collapsible pin 48 with a new pin, not shown, by installing its end portions in the valve stem and plate nut 62, as described hereinabove.

Obviously the invention is susceptible to changes or alternations without defeating its practicability. Therefore, I do not wish to be confined to the preferred embodiment(s) shown in the drawing(s) and described herein.

I claim:

1. An inline fluid release valve for a high pressure fluid conductor, comprising:

a valve body having a transverse flow passageway through the body and adapted to be axially interposed in a fluid conductor;

valve sealing rings at opposite limits of the flow passageway, said body having an upwardly open slot intersecting the passageway;

a centrally bored valve head closing the slot;

a plunger having an upper end and an opening therein and having a transverse aperture vertically moveable into and out of registration with the flow passageway and forming fluid pressure chambers at upper and lower limits of the plunger;

a valve stem having a depending end portion vertically slidably connected with the plunger end opening and slidably projecting through the valve head;

a disc in said plunger aperture for normally closing the fluid passageway; and, axially collapsible pin means for normally maintaining said valve stem and said plunger in passageway closed position and opening said passageway in response to fluid pressure in the fluid pressure chambers above a predetermined value impact moving the valve stem and plunger to a passageway open position.

2. The fluid release valve according to claim 1 in which the pin means comprises:

a pin cage means including a plate secured to said valve head in axial outstanding relation; and, an elongated rod-like pin axially extending between said valve stem and said plate.

3. The fluid release valve according to claim 2 in which the pin means further comprises:

a plurality of post means surrounding said pin in radially spaced relation for connecting said plate with said valve head.

4. An inline fluid release valve for a high pressure fluid conductor, comprising:

a valve body having a transverse flow passageway through the body and adapted to be axially interposed in a fluid conductor;

upstream and downstream valve sealing rings at in the flow passageway, said body having an upwardly open slot intersecting the passageway;

a centrally bored valve head closing the slot;

a plunger having an upper end and an opening therein and having a transverse aperture vertically moveable into and out of registration with the flow passageway for forming fluid pressure balanced chambers at upper and lower limits of the plunger;

a valve stem having a depending end portion vertically slidably connected with the plunger end opening and slidably projecting through the valve head;

a disc in said plunger aperture for normally sealing with the downstream seal ring and closing the fluid passageway; and, axially collapsible pin means normally maintaining said plunger in passageway closed position and opening said passageway in response to fluid pressure in the fluid pressure chambers above a predetermined value impact moving the valve stem and plunger to a passageway open position.

5. The fluid release valve according to claim 4 in which the pin means comprises:

a pin cage means including a plate secured to said valve head in axial outstanding relation; and, an elongated rod-like pin axially extending between said valve stem and said plate.

6. The fluid release valve according to claim 5 in which the pin means further comprises:

a plurality of post means surrounding said pin in radially spaced relation for connecting said plate with said valve head.

* * * * *